United States Patent [19]

Sandaiji et al.

[11] Patent Number: 5,063,653
[45] Date of Patent: Nov. 12, 1991

[54] METHOD OF PRODUCING A CORE FOR A MAGNETIC HEAD

[75] Inventors: Hideto Sandaiji, Kasugai; Koji Ikeda; Yuji Onishi, both of Nagoya, all of Japan

[73] Assignee: NGK Insulators, Ltd., Japan

[21] Appl. No.: 579,582

[22] Filed: Sep. 10, 1990

[30] Foreign Application Priority Data

Sep. 8, 1989 [JP] Japan ................................. 1-231665

[51] Int. Cl.$^5$ ............................................. G11B 5/42
[52] U.S. Cl. ...................................... 29/603; 427/130
[58] Field of Search .................. 29/603; 427/127–131; 156/643

[56] References Cited

U.S. PATENT DOCUMENTS 4,896,417 1/1990 Sawada et al. ......................... 29/603

Primary Examiner—Carl E. Hall
Attorney, Agent, or Firm—Parkhurst, Wendel & Rossi

[57] ABSTRACT

A method of producing a ferrite/Sendust composite core for a magnetic head, in which a metal film made of any one of metals of Zn, Cr, Fe, Cd, Co, Ni, Sn and Pb is formed on a surface, where a track of the core is formed, of a gapped bar composed of ferrite and Sendust, before the gapped bar is subjected to a laser-induced etching in an alkali metal hydroxide aqueous solution. The metal film serves to prevent the formation of dull at an edge portion of the track, so that a magnetic core can be obatined having a track which is free from dulls and high in reliability.

3 Claims, 2 Drawing Sheets

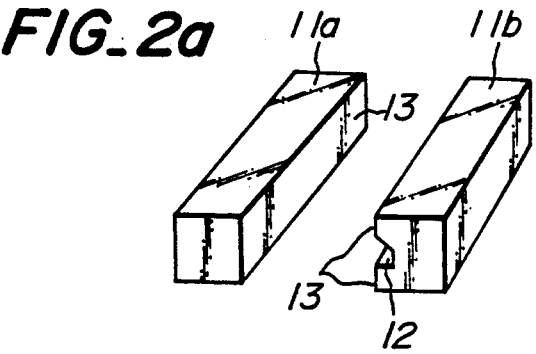
FIG_2a
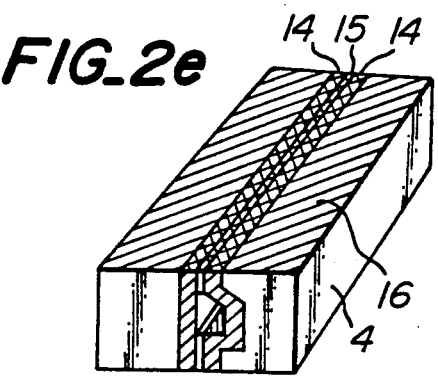
FIG_2e
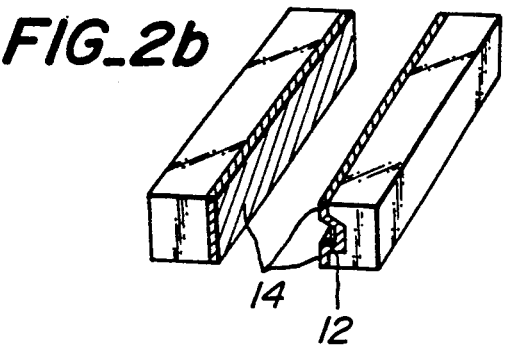
FIG_2b
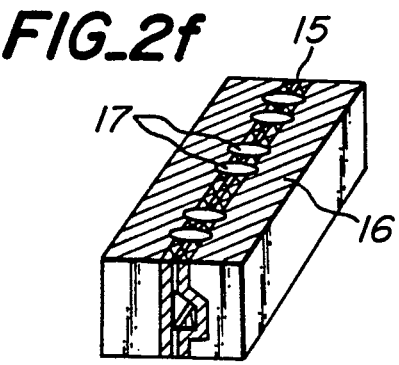
FIG_2f
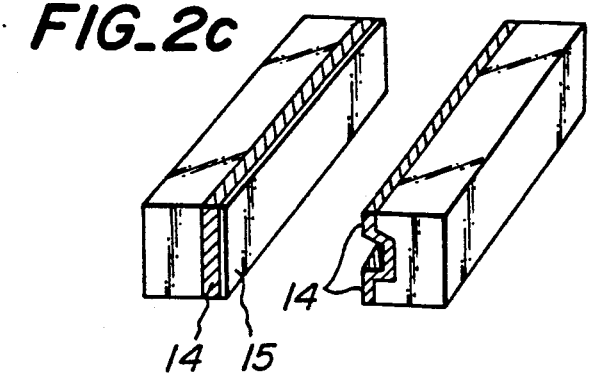
FIG_2c
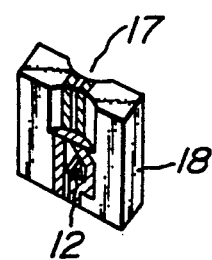
FIG_2g
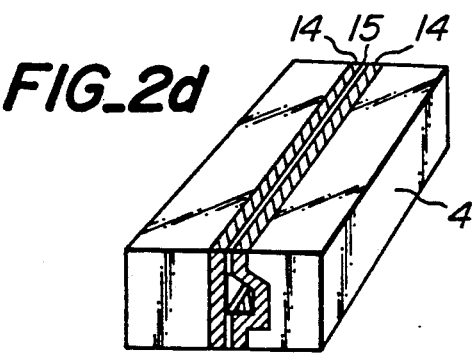
FIG_2d

METHOD OF PRODUCING A CORE FOR A MAGNETIC HEAD

BACKGROUND OF THE INVENTION

1. Field of the Invention

The present invention relates to a method of producing a core for a magnetic head, and more particularly relates to a method of producing a core for a magnetic head having a track formed by laser-induced etching wherein a thermochemical reaction is induced by a laser beam.

2. Related Art Statement

Recently, magnetic recorders, such as floppy disc drives (FDD), rigid magnetic disc drives (RDD), VTRS or the like, have been steadily highly-densified and, accordingly, the track width of the magnetic head used in the magnetic recorders must be narrower have a higher accuracy. Nowadays, the track width requires a dimensional accuracy lower than $\pm 2$ $\mu$m for VTR and FDD, or lower than $\pm 1$ $\mu$m for RDD.

In forming such cores for magnetic heads, there have heretofore been known a laser machining process in air of a track portion, which is disclosed in Japanese Patent Application Laid-open Nos. 29,118/76, 212,617/82, etc. Further, Japanese Patent Application Nos. 117,726/80, 260,408/86, etc. disclose the formation of the track, by laser machining in air, of a core for a magnetic head that is made of a high magnetic permeable alloy, such as Sendust or the like, or of a composite core for a magnetic head that is composed of ferrite and a high magnetic permeable alloy.

However, according to these methods, since the temperature of the material to be machined reaches above the melting point temperature of the material, a processing strain is formed on the machined surface due to heat, accompanied by the formation of cracks on the surface, and thus properties of the resulting magnetic head are deteriorated. Further, these methods have presented problems such that melted and solidified substances or melted and scattered substances adhere to the machined surface and the vicinity thereof. Additionally problems such as a thermal strain, cracks or the like, occur to deteriorate the surface roughness or dimensional accuracy, which do not allow a track processing of high accuracy to be conducted with a dimensional accuracy lower than $\pm 2$ $\mu$m, which has recently been strongly required.

Meanwhile, Japanese Patent Application Laid-open No. 60,995/85, the Precision Machine Society, 1985, Spring Symposium, Scientific Lecture Articles (Presentation No. 404) and Engineering Materials, 33, No. 14 (P.57~p.62) disclose, in a field other than the magnetic head processing, three methods of machining ceramics, such as ferrite, $Si_3N_4$, SiC or the like, by a laser-induced etching wherein a laser beam is irradiated in a potassium hydroxide aqueous solution. However, any of these methods disclosed in the above references lack requirements for obtaining a high accuracy which is necessary for magnetic head processing, so that the machining with such an accuracy as required in the magnetic head processing has not been performable.

SUMMARY OF THE INVENTION

The object of the present invention is to obviate the drawbacks of the above-described conventional methods, particularly to obviate the drawback that dulls are formed at edge portions of a track formed on the magnet core, and to provide a method wherein a track with a high accuracy is machined by a laser-induced etching method to produce cores for magnetic head with high reliability.

A method of producing a core for a magnetic head having a track according to the invention, comprises:

forming a composite of gapped bar composed of ferrite and Sendust;

forming a metal film made of any one of metals of Zn, Cr, Fe, Cd, Co, Ni, Sn and Pb on at least a surface, where the track is formed, of the composite of gapped bar;

subjecting the gapped bar to a laser-induced etching in an alkali metal hydroxide aqueous solution to form grooves which define a thickness of the track of the core for magnetic head; and cutting out the core having a predetermined width from the gapped bar.

In the method stated in the above, at least on the portion, of the gapped-bar, where the track is formed having a coil turn hole and a magnetic gap is first formed a metal film made of any one of Zn, Cr, Fe, Cd, Co, Ni, Sn and Pb. Thereafter and thereafter, the gapped bar is subjected to the laser beam to form grooves defining the track width of the track of the magnetic core on the surface of the gapped bar in the alkali metal hydroxide aqueous solution. Therefore, a highly accurate track that is free from adhesion of solidified molten substances and free from dulls formed at the edge portions thereof can be obtained.

The dimensional accuracy of the grooves to define the track width is required to be lower than $\pm 2$ $\mu$m, preferably lower than $\pm 1$ $\mu$m. Accordingly, it is required to restrain the dimension of the dull formed at the edge portions of the track to be lower than 0.5 $\mu$m in radius, preferably lower than 0.25 $\mu$m in radius. In the laser-induced etching method applied to the present invention, the alkali metal hydroxide aqueous solution serves as an etching solution for etching the surface of the gapped bar.

Iron, which is a main component of the composition of ferrite and Sendust, is etched in the alkali metal hydroxide aqueous solution with a high temperature in a good manner. However, aluminum, which is one of the components of the compositions of Sendust, is etched in the alkali metal hydroxide aqueous solution in an excessive manner. Additionally, since Sendust has a high heat conductivity, dulls are often formed at the edge portion of the track made of Sendust. In such a case, the dimensional accuracy for the track is so decreased that the above-mentioned requirement for forming the track cannot be carried out. In the present invention, in order to restrain dulls from forming at the edge portions of the track, the metal film is firstly formed at least on the portion of the gapped bar, where the track is formed; and thereafter the gapped bar is machined by a laser beam in the alkali metal hydroxide aqueous solution. The metal film serves to protect the track portions of the gapped bar from over etching of aluminum included in Sendust, to restrain big dulls from forming at the edge portion of the track; and to make the dimension of the dulls formed at the edge portion of tracks to be lower than 0.5 $\mu$m in radius.

The reason for selecting Zn, Cr, Fe, Cd, Co, Ni, Sn and Pb as the material of the metal film is explained below. When the gapped bar is immersed in the alkali metal hydroxide aqueous solution a potential difference occurs between ferrite and Sendust (a battery is formed). Since a natural potential of Sendust is lower than that of ferrite in alkali metal hydroxide aqueous solution and an area fraction of ferrite is larger than that of the Sendust in the gapped bar, the natural potential of the gapped bar as a whole becomes close to the natural potential of ferrite. Therefore, the potential difference between ferrite and Sendust is not so large with respect to the natural potential of ferrite but large with respect to that of Sendust. Thus when the Sendust constituting of the gapped bar is exposed in the aqueous solution for etching, an electric current flows the Sendust side, so that only Sendust constituting of the gapped bar is etched. Therefore, it is required for the metal film formed on the gapped bar to make the potential of the gapped bar as a whole close to the natural potential of Sendust. It is also required that the natural potential of the metal film is lower than that of ferrite. On the other hand, the metal having a natural potential lower than that of Sendust is not appropriate for the metal film, because such metal is etched by the battery formed due to the potential difference between ferrite and Sendust, and the metal does not serve as a protection film. Therefore, Zn, Cr, Fe, Cd, Co, Ni, Sn and Pb, whose natural potentials are higher than Sendust but lower than ferrite, are selected as the material of the metal film.

The metal film is formed on the surface of the gapped bar by sputtering, deposition with the aid of electron beam, metal plating, etc. The desired thickness of the metal film is 200 Å to 5000 Å, particularly 300 Å to 1500 Å. If the thickness is smaller than the lower limit of this range, the metal film does not serve to prevent the formation of big dulls due to the small film strength thereof. On the other hand, if the thickness is larger than the upper limit of the range, the desired etching depth of the grooves could not be obtained or the dimensional accuracy would be decreased, because the machining effectivity is deteriorated due to the thickness. After forming the grooves in the gapped bar, the metal film is removed by means of dry etching or wet etching, etc.

BRIEF DESCRIPTION OF THE DRAWINGS

FIGS. 2a to 2g are perspective views showing the procedure in the case where the present invention is applied to the production of a ferrite/Sendust composite core for a VTR magnetic head.

Figure 1:
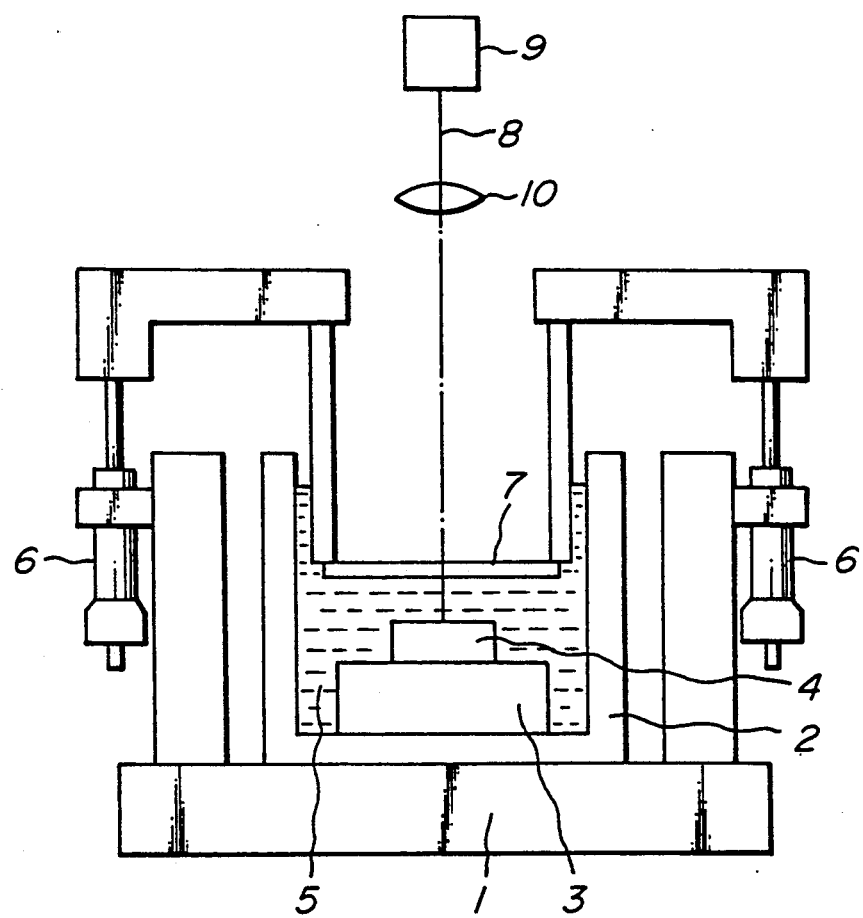
FIG. 1 is a diagrammatic view of one embodiment of apparatuses to be used for carrying out the present invention.

DESCRIPTION OF THE PREFERRED EMBODIMENTS (1) Structure of apparatus

FIG. 1 illustrates an embodiment of an apparatus to be used for carrying out the present invention. In this embodiment, container 2 is placed on an X-Y stage 1. In the container 2, there are arranged a sample holder 3 and a gapped bar 4 to be processed. The container 2 is filled with an alkali metal hydroxide aqueous solution 5, such as potassium hydroxide, sodium hydroxide or the like. The liquid level of the aqueous solution 5 above the gapped bar 4 is controlled by a quartz window 7 whose position is adjustable by means of a micrometer 6. If the liquid level of the aqueous solution 5 is too low, the flow rate of the aqueous solution is decreased whereby the aqueous solution is heated up excessively and bubbles are apt to be generated. Therefore, the etched depth is decreased and the dimensional accuracy is lowered. When the liquid level is set at 200 $\mu$m or more, there may scarcely be such an influence. However, when the liquid level is too high, the light amount of the laser beam is decreased when the laser beam passes through the aqueous solution, the etched depth is decreased, or a convection is formed in the aqueous solution due to upward and downward flows of the solution. In case the connection is formed in the aqueous solution, waste ejected from the etching point or bubbles, are raised by the convection and the laser beam is scattered by the waste and bubbles, resulting in decrease of the etched depth and dimensional accuracy. Therefore, it is preferred to set the liquid level at least 200 $\mu$m, more preferably 300~10,000 $\mu$m.

Further, the quartz window 7 serves to control the liquid level and eliminate the fluctuation of the liquid surface, resulting in improvement of the dimensional accuracy. A laser beam 8 is emitted from a laser source 9 to irradiate onto the gapped bar 4 through a lens system 10 and the quartz window 7. Then, an etching of a predetermined pattern can be carried out by moving the X-Y stage 1.

(2) Production of a core for magnetic head

FIGS. 2a to 2g show a flow diagram illustrating the procedure in the case where the present invention is applied to the production of a ferrite/Sendust composite core for VTR magnetic head. On the outset, as shown in FIG. 2a, a ferrite bar 11a and a ferrite bar 11b having a coil turn hole 12 are prepared. On surfaces 13, 13 opposite to each other of the respective bars 11a, 11b are formed films 14 made of Sendust each having a thickness of 5 $\mu$m, as shown in FIG. 2b. Further, on the film of Sendust formed on the ferrite bar 11a, is formed non-magnetic material layer 15, such as a SiO$_2$ layer, with the same thickness as a predetermined gap length, as shown in FIG. 2c. Thereafter these bars 11a and 11b are bonded with each other by means of a glass-cementing to form a gapped bar 4 having magnetic gap 15 as shown in FIG. 2d. After the gapped bar 4 is ground to a predetermined dimension, a metal film 16 made of Cr is formed on the one surface, where the track is formed, of the gapped bar 4 with a thickness of 500 Å.

Then, the prepared gapped bar 4 is set in the apparatus shown in FIG. 1 and a plurality of grooves 17 defining a track width 13 are machined on the gapped bar 4 as shown in FIG. 2e, under conditions such that the laser power is 100 mW, the scanning speed is 10 $\mu$m/sec, the focused laser beam diameter is 4 $\mu$m, the concentration of potassium hydroxide aqueous solution is 25% by weight, and the liquid level is 500 $\mu$m. Thereafter, the film of Cr 16 is removed and cores 18 having a predetermined width are cut out from the processed gapped bar. Thus, cores for VTR magnetic head 18 as shown in FIG. 2g are obtained.

On the thus obtained core for magnetic head 18, a highly accurate track that is free from microcracks or adhesion of solidified molten substances and free from dulls at the edge portion of the track is formed, which is high in reliability.

Additionally, the present invention is not intended to be limited to the manufacturing method of cores for VTR magnetic head and can be suitably applied to the cores for diversified magnetic heads, such as RDD, FDD, or the like. Further, the present invention is not limited to the track machining and also can be suitably utilized in various processings of ferrite materials, Sendust materials and further composite materials of ferrite and Sendust, such as machining of coil turn holes, machining of air bearing surface, or the like.

In the above mentioned embodiment, the Cr film is used as the metal film 16, however, the other metals cited in this specification also may be used as the metal film 16.

As described above, according to the producing method of the present invention, tracks having a narrow width and being free from dulls can be formed on a gapped bar in a high accuracy by irradiating a predetermined laser beam at a predetermined scanning speed in an alkali metal hydroxide aqueous solution of a predetermined concentration after forming the metal film on the surface of the ferrite/Sendust composite magnetic gapped bar, so that cores for magnetic heads can be produced with high reliability.

What is claimed is:

1. A method of producing a core for a magnetic head, comprising the steps of:

forming a composite, gapped bar comprising ferrite and high magnetic permeable alloy;

providing a metal film on at least an upper surface of said composite, gapped bar, said metal film comprising a metal selected from the group consisting of Zn, Cr, Fe, Cd, Co, Ni, Sn and Pb;

subjecting said composite, gapped bar to laser-induced etching in an alkali metal hydroxide aqueous solution to form a plurality of spaced grooves through said metal film and into said upper surface, said grooves defining at least one magnetic gap in said upper surface;

removing said metal film from said composite, gapped bar; and cutting at least one magnetic core from said composite, gapped bar, said at least one magnetic core including at least one magnetic track.

2. The method of claim 1, wherein said forming step comprises:

providing a first and a second ferrite bar having opposed surfaces, one of said first and second ferrite bars having a longitudinal groove formed therein; and forming a layer of high magnetic permeable alloy on each opposed surface of said first and second ferrite bars.

3. The method of claim 2, wherein said high magnetic permeable alloy consists of Sendust.

* * * * *